United States Patent [19]
English et al.

[11] Patent Number: 6,094,812
[45] Date of Patent: Aug. 1, 2000

[54] DISHING AVOIDANCE IN WIDE SOFT METAL WIRES

[75] Inventors: George English, Salt Point, N.Y.; Joachim Keinert, Altdorf, Germany; Oliver Rettig, Poughkeepsie, N.Y.

[73] Assignee: International Business Machines, Armonk, N.Y.

[21] Appl. No.: 09/163,149

[22] Filed: Sep. 29, 1998

[51] Int. Cl.[7] .................................................. H01K 3/10
[52] U.S. Cl. .............................. 29/852; 29/827; 29/846
[58] Field of Search ............................ 29/827, 852, 830, 29/825, 846

[56] References Cited

U.S. PATENT DOCUMENTS 5,678,301  10/1997  Gochnour et al. ..................... 29/827

*Primary Examiner*—Carl J. Arbes
*Attorney, Agent, or Firm*—Jay H. Anderson

[57] ABSTRACT

A method of manufacturing semiconductor circuits or electronic packages is provided. The step of splitting up wide metal areas into metal stripes is included into the physical design step of such devices. This method does not increase the data complexity significantly and guarantees correctness of the design. Furthermore, the method allows to solve the dishing problem that is inherent to copper wiring technologies.

18 Claims, 1 Drawing Sheet

DISHING AVOIDANCE IN WIDE SOFT METAL WIRES

FIELD OF THE INVENTION

The present invention generally relates to the art of microelectronic circuit fabrication, and more specifically to the physical design of a microelectronic integrated circuit. Still more specifically, it relates to the avoidance of dishing of weak metal like copper during the process of planarization by chemical-mechanical polishing (CMP).

BACKGROUND OF THE INVENTION

Semiconductor integrated circuits and printed circuit electronic packages are generally structures consisting of several layers of conducting, insulating and other materials that are structured in the horizontal dimension by fabrication processes that transfer patterns defined in physical designs or layouts. A layout consists of a set of planar geometric shapes in several layers. These physical designs or layouts are typically represented as computer data consisting of two dimensional shapes in a hierarchical data structure that exploit the repetitive structure usually found in such circuits and packages. The design files are then converted into pattern generator files that are used to produce patterns called masks.

In some cases, the action of the fabrication process is affected by the design patterns being transferred to the physical materials. For example, the local pattern density of the design, i.e., the fraction of area over which material is deposited (or removed) can affect the shapes and dimensions of features, with the "locality extent" dependent on the specific fabrication process. A special process that may be affected by local pattern density is chemical-mechanical (so called "chemech") polishing (CMP). CMP is used to planarize semiconductor substrates. Planarization is becoming more and more important as the numbers of layers used to form a semiconductor device increases. Nonplanar substrates show many problems including difficulties in patterning a photoresist layer, formation of a void within a film during film deposition, and incomplete removal of a layer during an etch process leaving residual portions of the layer.

However, CMP has the disadvantage of showing so called "dishing" when polishing areas of wide metal. Especially in case copper is used this effect will result in nonplanar surfaces of the substrate, leading to the difficulties mentioned above.

FIG. 1 shows two situations where dishing occurs. Within smaller wires (A) dishing can be neglected to a certain degree, whereas for wide wires (B) it shows big impact on the metal's resistance and on the manufacturability.

PRIOR ART

Several methods are known to avoid dishing, some of them using extra process steps.

In U.S. Pat. No. 5,539,240, Cronin et al. describe the manufacture of subminimum silicon pillars extending vertically upward from the base of a wide trench, and oxidizing the pillars. When the substrate is covered with a conformal CVD oxide, the pillars prevent the formation of a single deep depression above the trench. Instead, a series of relatively shallow depressions is formed. The resultant surface is therefore easier to planarize.

Jang et al., U.S. Pat. No. 5,721,172, propose a self-aligned polish stop layer hard masking method for forming planarized aperture fill layers, thereby avoiding dishing, whereas U.S. Pat. No. 5,618,381 by Doan et al. discloses a two-phase selective CMP process with a minimized degree of dishing.

However, as already mentioned above, these methods involve additional process steps leading to increased turn-around-times and decreased correctness of the design and yield.

Another state of the art possibility to reduce dishing is to avoid an additional process step but to include a data preparation step for mask making after the physical design. Thus, in U.S. Pat. No. 5,671,152 to Lavin et al., there is disclosed a method of generating holes through shapes in tiles or unit cells containing negative fill shapes (so-called "Cheesing"). Metal areas wider than the size of a unit cell are then covered with abutting unit cells in order to get a regularly distributed tiling structure. However, this proposal has the disadvantage that the resistance of a tiled wire increases by about 12% due to a loss of metal where the negative fill shapes are introduced. Furthermore, the determination of areas to be tiled and the introduction of the unit cells into the layout data is very complicated and increases the turn-around-time in a high degree. Since the number of shapes increases by about the factor 1000, handling the resulting data is also very complicated (e.g., DRC checking). An alternate tiling pattern could reduce the number of shapes but not significantly and unfortunately only in conjunction with higher wiring resistance. In addition to that, tiling is applied after via insertion, hence it cannot be guaranteed that groundrules for DRC can be met.

SUMMARY OF THE INVENTION

It is therefore an object of the present invention to provide an effective method to design semiconductor integrated circuits or electronic packages that solves the dishing problem associated with the CMP process.

It is another object of the invention to provide such a method without increasing the data complexity significantly.

It is a further object of the present invention that the wiring resistance is not made worse, but on the contrary the resulting values are shown from the beginning.

The foregoing and other objects and advantages are achieved by the methods according to claims 1 and 8.

Advantageous embodiments are laid down in the dependent claims.

BRIEF DESCRIPTION OF THE DRAWINGS

The invention will hereinafter be described in more detail with reference to the accompanying drawings, in which.

DETAILED DESCRIPTION OF A PREFERRED EMBODIMENT OF THE INVENTION

Figure 1:
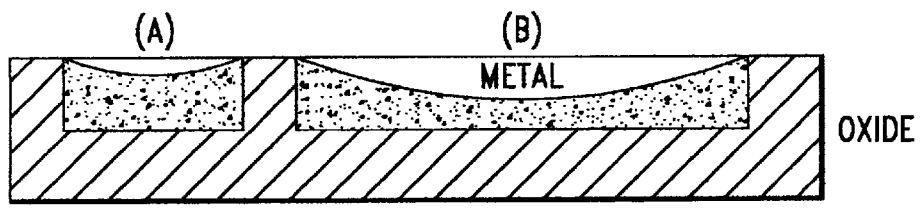
FIG. 1 shows two situations where dishing occurs.

As can be taken from FIG. 1, dishing occurs within smaller lines as well as within wide lines. Within smaller lines (A) this effect can be neglected up to a certain degree, whereas for wider lines (B) dishing shows a big impact onto the metal's resistance and on the manufacturability.

The present invention describes the technique of splitting up wide metal areas into metal stripes from the very beginning of the design, i.e., the step of splitting up the metal areas is already included into the physical design. Thus, splitting of wide lines forms part of the steps of building and placing of the functional elements as well as their wiring within the metal layers.

In the following it is described how wires are split up, how the interconnection between distinct metal layers is handled, what is needed to connect to tiled Controlled Collapse Chip Connections (C4s) and how a power grid is designed using very wide—but split up—wires to keep the voltage drop across the grid as low as with non-split wires.

It is known and can also be taken from FIG. 1 that there exists a width threshold $w_1$ where the dishing starts to impact the wiring resistance. The minimum width of a line is $w_0$ as defined as a layout groundrule. Narrow lines having a width $w \leq w_1$ must have a minimum spacing of $s_0$ in order to avoid shortening to neighboured wires due to tolerances in the manufacturing process; lines with a width $w > w_1$ must have a spacing of $s \geq s_1$, lines with a width $w > w_2$ must have a spacing of $s \geq s_2$, etc. It is assumed that lines can have a maximum width of $w_{max}$ and accordingly must then have a spacing of at least $s_{max}$ with $w_0 < w_1 < w_2 < \ldots < w_{max}$ and $s_0 < s_1 < \ldots < s_{max}$.

That means that the following rule has to be fulfilled as a first step towards dishing avoidance:

Rule 1: Define wire separation in such a way that the layout rules for increased metal spacing are feasible for wires having a width less than $w_{max}$.

Wider wires have to be split into distinct stripes according to

Rule 2: Split wires wider than $w_{max}$ into distinct stripes with spacings in between and to the outside that do follow the increased metal spacing rules.

For example, a last metal power line is usually very wide, far beyond $w_{max}$ in order to keep the voltage drop below a certain limit. One possible solution could be to split the wire into $n=[w/w_{max}]$ stripes each of it at least $w/n$ wide and below $w_{max}$ with the appropriate spacing of $s_{max}$ to the outside and a gap of the same width in between of them.

For a split wire the resistance will be kept the same as with an unsplit wire if the additional area can be spent. If, due to wireability, it is not possible to accept this additional blockage, then the resistance of the wire will increase by 12,6% as compared to 12% of the original tiling approach defined in U.S. Pat. No. 5,671,152 to Lavin et al., which is well known from the beginning rather than worsening the resistance after wiring has been completed.

Figure 2:
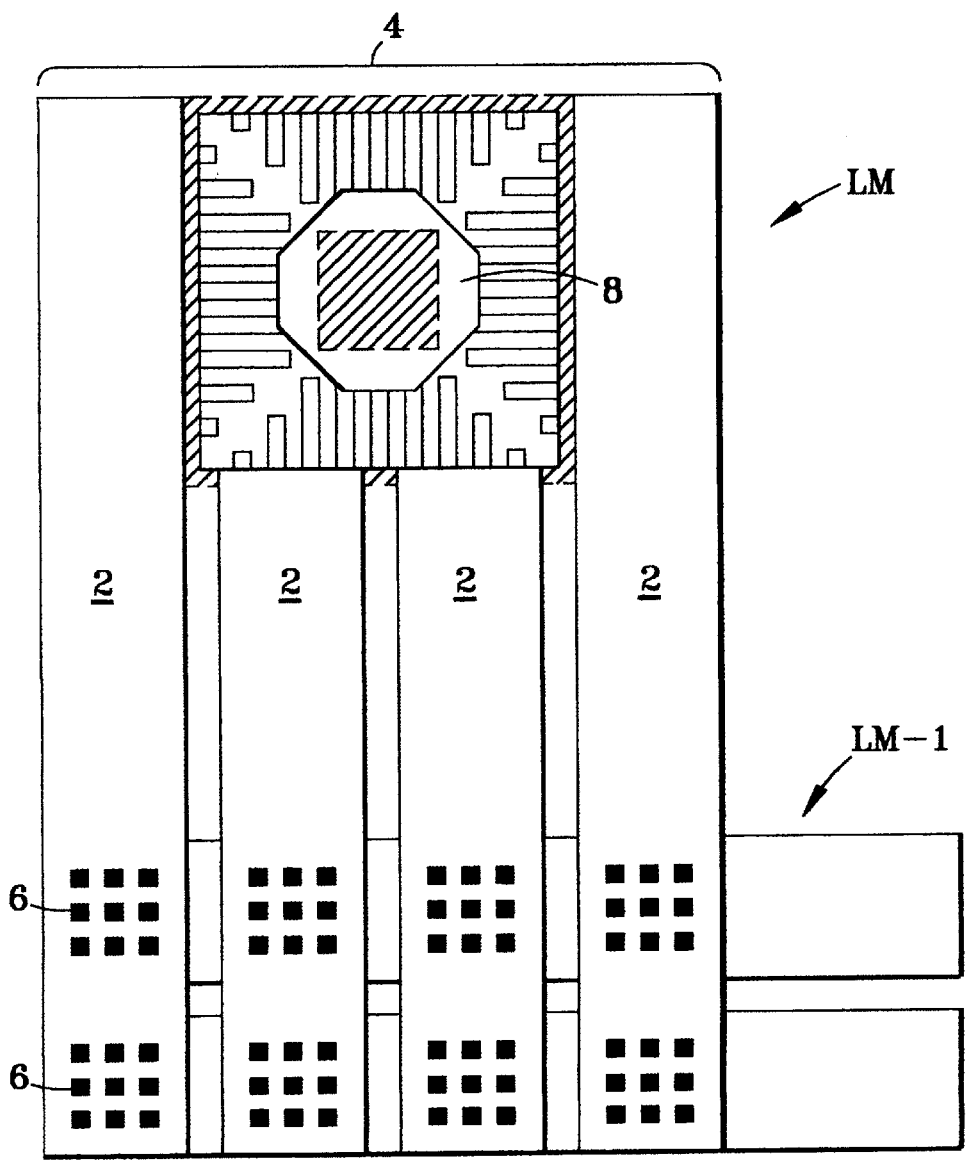
FIG. 2 shows split wires according to the invention.

By splitting the wires the number of shapes for this wire does increase only by approximately a factor of sqrt(m)/4 with m being the number of shapes used when doing cheesing. Considering last metal, some signal wires as well as the power wires need to be striped. In FIG. 2, e.g. four stripes 2 for each line 4 of last metal (LM) are shown, resulting in an increase by no more than a factor of 4 which is usually to be neglected.

Each metal layer has its own preferred wiring direction, either horizontally (LM-1 in FIG. 2) or vertically (LM in FIG. 2). If a wire changes its direction, usually a via from one layer to the one above or below is placed.

For unsplit wires an array of vias is placed where the two segments are overlapping each other and more than one via does fit into the overlap area. For a tiled wire vias need to be avoided where pegs or pillars according to the prior art are already inserted, or pegs or pillars are not to be placed where vias do already exist. First, the wire resistance increases additionally due to the missing vias, for the latter, dishing takes place, if no or not a sufficient number of pegs or pillars can be placed.

Wires that meet the existing increased metal spacing rules are showing a regular array of vias. Accordingly, it is no longer necessary to treat the vias separately. Split wires do get vias inserted only at these locations where an overlap actually exists. In FIG. 2, the wire segment, i.e., the accumulated width of the four segments 2 together on last metal LM is much wider than for the metal below, LM-1, and arrays 6 of vias are inserted e.g. in the 2×4=8 overlap regions. The areas where vias are inserted are thus well defined whereas the tiling process according to the state of the art needs to remove some vias where pegs or pillars have to come in which is non-deterministic and can result in unpredictable tiling structures if run more than only once. Via insertion within the present invention does not increase the resistance and does avoid dishing, actually.

The present invention can also be used when connecting metal shapes to C4 pads specifically designed to be compatible with, e.g., the last metal (LM) tiling requirements according to the state of the art. FIG. 2 shows a sketch of such a design, where the pad opening is marked with the reference numeral 8. To avoid a LM shape from overlapping the peg or pillar rectangles within the C4 area, a blockage needs to be defined on LM for the wiring process, so that no wires can be placed here. The dashed rectangles do show the areas where LM segments may enter at the border (so-called donut shape) and where vias from the metal layer below (LM-1) are allowed to be placed within the center area of 8. Within that C4 area the pegs are designed in such a way that a sufficient connection from the outside is achieved, i.e., through the C4 lead ball that is placed onto the C4 contact pad on LM. Since the current can flow from all sides into the middle of the contact pad and from there into the striped wires, the pegs are long-drawn-out not to hinder it from flowing, i.e., increasing the resistance. Outside the C4 area within the wires the stripes do achieve the same long-drawn pegs that run the same direction as the current flows keeping the resistance at a minimum while avoiding dishing.

As mentioned above, on LM a very wide power wiring is needed to keep the voltage drop at minimum. For C4 area footprints, i.e., connections distributed over the chip area, these wide power lines are running across the whole chip area wearing VDD and GND alternately. These long wires are split up as shown in FIG. 2 from one chip edge to the other, striped where no C4 is located and split up at the C4s where pegs or pillars have already been designed before specifically for this area.

The invention described herein does solve the dishing problem that is inherent especially to copper wiring technologies but also to all other soft metal wiring. It comprises wires, vias between wire segments and C4 connections to the environment. Rather than to establish a post-process that is worsening the turn-around-time of the development process, the complexity of the data, the resistance of the wiring, and last but not least is not able to guarantee correctness of the design, the method described allows to keep the turn-around-time the same as before, does not increase the data complexity significantly, does not make the wiring resistance worse afterwards, but to the contrary does show the resulting values from the beginning, and guarantees correctness of the design.

Additionally no special via handling is necessary and overlapping LM shapes over the C4 peg or pillar area are avoided by blockage definition. Thus, elimination of the pegs or pillars or groundrule violations due to insufficiently small pegs or pillars in the C4 contact pad are avoided.

We claim:

1. A method of manufacturing semiconductor integrated circuits or electronic packages including metal areas, the method comprising the steps of:

determining an optimal arrangement of devices and an efficient metal line routing scheme between said devices;

determining a maximum width for said metal areas in accordance with effects of dishing on said metal areas due to chemical mechanical polishing; and determining an arrangement of said metal areas so that metal areas having a width greater than the maximum width are split into redundant metal stripes, wherein said determining steps are performed prior to fabrication of the integrated circuits or electronic packages.

2. A method according to claim 1, wherein said integrated circuits or electronic packages include copper wiring.

3. A method according to claim 1 or 2, wherein said metal lines are split into distinct stripes belonging to a single wire segment.

4. A method according to claim 1 or 2, wherein vias are only inserted at locations where an overlap between metal layers exists.

5. A method according to claim 1 or 2, further comprising a step of providing a top metal layer having C4 pads for receiving electronic components.

6. A method according to claim 5, wherein a blockage is defined to prevent metal segments from overlapping with said C4 pads.

7. A method according to claim 5, wherein long power lines are split from one chip edge to the other, striped where no C4 pad is located and split up at the C4 pads.

8. A method according to claim 3, wherein vias are only inserted at locations where an overlap between metal layers exists.

9. A method according to claim 3, further comprising a step of providing a top metal layer having C4 pads for receiving electronic components.

10. A method according to claim 3, further comprising a step of providing a top metal layer having C4 pads for receiving electronic components.

11. A method according to claim 3, further comprising a step of providing a top metal layer having C4 pads for receiving electronic components.

12. A method according to claim 9, wherein a blockage is defined to prevent metal segments from overlapping with said C4 pads.

13. A method according to claim 10, wherein a blockage is defined to prevent metal segments from overlapping with sa d C4 pads.

14. A method according to claim 11, wherein a blockage is defined to prevent metal segments from overlapping with said C4 pads.

15. A method according to claim 9, wherein long power lines are spirit from one chip edge to the other, striped where no C4 pad is located and split up at the C4 pads.

16. A method according to claim 9, wherein long power lines are split from one chip edge to the other, striped where no C4 pad is located and split up at the C4 pads.

17. A method according to claim 11, wherein long power lines are split from one chip edge to the other, striped where no C4 pad is located and split up at the C4 pads.

18. A method of preventing dishing during planarization of metal areas in semiconductor structures, especial y by chemical mechanical polishing, comprising the steps of:

determining a maximum width for said metal areas in accordance with effects of dishing on said metal areas due to chemical mechanical polishing; and determining an arrangement of said metal areas so that metal areas having a width greater than the maximum width are split into redundant metal stripes, wherein said determining steps are performed prior to fabrication of the semiconductor structures.

* * * * *